US011796558B2

(12) United States Patent
Petillon (10) Patent No.: US 11,796,558 B2
(45) Date of Patent: Oct. 24, 2023

(54) METHOD AND APPARATUS FOR ESTIMATING AN AIRSPEED OF A ROTORCRAFT BY ANALYZING ITS ROTOR

(71) Applicant: AIRBUS HELICOPTERS, Marignane (FR)

(72) Inventor: Jean-Paul Petillon, Le Vigan (FR)

(73) Assignee: AIRBUS HELICOPTERS, Marignane (FR)

(*) Notice: Subject to any disclaimer, the term of this patent is extended or adjusted under 35 U.S.C. 154(b) by 333 days.

(21) Appl. No.: 17/081,439

(22) Filed: Oct. 27, 2020

(65) Prior Publication Data
US 2021/0132103 A1     May 6, 2021

(30) Foreign Application Priority Data

Nov. 5, 2019 (FR) ........................................ 1912396

(51) Int. Cl.
| | | |
|---|---|---|
| *G01P 5/02* | (2006.01) | |
| *B64F 5/60* | (2017.01) | |
| *B64C 27/06* | (2006.01) | |
| *G01C 23/00* | (2006.01) | |

(52) U.S. Cl.
CPC ................ *G01P 5/02* (2013.01); *B64C 27/06* (2013.01); *B64F 5/60* (2017.01); *G01C 23/00* (2013.01)

(58) Field of Classification Search
CPC ........................................................ G01P 5/02
See application file for complete search history.

(56) References Cited

U.S. PATENT DOCUMENTS

| | | | |
|---|---|---|---|
| 2,521,012 A | * | 9/1950 | Kay ........................ B64C 27/08 244/17.11 |
| 4,023,409 A | | 5/1977 | Durand |
| 4,430,045 A | * | 2/1984 | Cresap ................... B64C 27/001 416/138 |

(Continued)

FOREIGN PATENT DOCUMENTS

| | | |
|---|---|---|
| FR | 2282644 A1 | 3/1976 |
| FR | 2565270 A1 | 12/1985 |

OTHER PUBLICATIONS

Li, Yang et al. Modeling of a class of UAV helicopters using component buildup method. ECON 2017—43rd Annual Conference of the IEEE Industrial Electronics Society, IEEE, Oct. 29, 2017 (Oct. 29, 2017), pp. 6893-6898. 6 pages.

(Continued)

*Primary Examiner* — Hyun D Park
(74) *Attorney, Agent, or Firm* — Brooks Kushman P.C.

(57) ABSTRACT

A method and apparatus for estimating an airspeed of a rotorcraft by analyzing its rotor. The rotorcraft includes a fuselage and a main rotor that is equipped with a plurality of blades and that rotates about an axis of a hub of the rotor, and in which the free end or "tip" of each blade describes a path in the vicinity of a tip-path plane. The method makes it possible to determine said airspeed of the rotorcraft in a frame of reference united with the tip-path plane by solving a model of the rotor that puts a pitch angle of at least one blade relative to the tip-path plane into relation with the airspeed of the rotorcraft and with an auxiliary speed. The auxiliary speed may be an induced velocity of the air flowing through the rotor or else an axial airspeed at the upstream infinity of the rotorcraft.

12 Claims, 2 Drawing Sheets

(56) References Cited

U.S. PATENT DOCUMENTS

| | | | | |
|---|---|---|---|---|
| 4,574,360 | A | * | 3/1986 | Bateman ................ G01G 19/07 244/17.11 |
| 5,063,777 | A | | 11/1991 | Arethens et al. |
| 5,478,029 | A | * | 12/1995 | Schmitz .................. B64C 27/28 244/17.11 |
| 7,324,016 | B1 | * | 1/2008 | Milgram ............... B64C 27/023 340/978 |
| 2012/0089362 | A1 | | 4/2012 | Mandle |
| 2012/0263590 | A1 | * | 10/2012 | Mercier Des Rochettes ............... B64C 27/473 416/1 |
| 2013/0325218 | A1 | * | 12/2013 | Spoldi ................... B64C 13/503 701/14 |
| 2015/0219512 | A1 | * | 8/2015 | Bruti ....................... G01L 13/00 701/14 |
| 2016/0347467 | A1 | | 12/2016 | Salesse-Lavergne |

OTHER PUBLICATIONS

French Search Report for French Application No. FR1912396, Completed by the French Patent Office, dated Jul. 20, 2020, 9 pages.

* cited by examiner

METHOD AND APPARATUS FOR ESTIMATING AN AIRSPEED OF A ROTORCRAFT BY ANALYZING ITS ROTOR

CROSS REFERENCE TO RELATED APPLICATIONS

This application claims priority to French patent application No. of FR 19 12396 filed on Nov. 5, 2019, the disclosure of which is incorporated in its entirety by reference herein.

(1) FIELD OF THE INVENTION

The present invention lies in the field of anemometer installations that equip rotorcraft.

The present invention relates to a method of estimating a speed of a rotorcraft relative to the air by analyzing its rotor, and also relates to apparatus for estimating said speed relative to the air. The method and the apparatus are based on using cyclic pitches of the blades of the rotor of the rotorcraft relative to the plane of the rotor disk or "tip-path plane" (TPP).

(2) DESCRIPTION OF RELATED ART

An aircraft is conventionally equipped with an anemometer installation that gives the pilot an indication of speed of the aircraft relative to the air. For simplification reasons, the speed of the aircraft relative to the air is referred to below as "airspeed".

An orthonormal frame of reference is usually defined relative to the fuselage of an aircraft by three particular axes: a longitudinal axis extending in a direction going from the tail of the aircraft to the nose of the aircraft; a normal axis extending in a direction going downwards perpendicularly to the longitudinal axis; and a lateral axis extending in a direction going from left to right perpendicularly to the longitudinal and normal axes. Those axes thus define a frame of reference associated with the fuselage that is usually referred to as a "body frame of reference".

The term "longitudinal" relates to any projection of a vector on the longitudinal axis. The term "lateral" relates to any projection of a vector on the lateral axis. The term "normal" relates to the projection of that vector on the normal axis.

As regards movements in rotation, the longitudinal axis of the body frame of reference also constitutes the roll axis of the aircraft, the lateral axis constitutes its pitch axis, and the normal axis constitutes its yaw axis. The longitudinal and lateral axes are generally chosen in such a manner that the plane they form is substantially horizontal at the mean cruising speed of the rotorcraft. The longitudinal and normal axes form a plane of symmetry for the fuselage of the rotorcraft.

An anemometer installation conventionally used in aviation commonly implements a Pitot tube and a static pressure port, and makes it possible to deduce the airspeed of the aircraft from the differences between measurements of the static pressure of the air, which static pressure is independent of the speed of the aircraft, and of the total ram or impact pressure of the air ramming into said Pitot tube. However, such an anemometer installation is inaccurate in the low-speed range. Furthermore, it measures the amplitude of the airspeed correctly only when the direction of said airspeed does not deviate too much from the axis of the Pitot tube, which axis is generally substantially parallel to the longitudinal axis of the aircraft. The Pitot tube has a "measurement cone" that is generally limited to values in the range ±20°. The anemometer installation does not therefore make it possible to provide vector information.

In addition, such an anemometer installation is sensitive to the square of the forward speed of the aircraft that is close to the difference between the static pressure and the total pressure of the air. It is therefore necessary for said difference in pressure to be sufficient to determine a stable and accurate airspeed. Therefore, such an anemometer installation cannot provide a good measurement at low airspeeds, and typically when the airspeed is lower than 30 knots (30 kts). It is recalled that a speed of one knot (1 kt) corresponds to a distance equal to one nautical mile (1 NM) being travelled in one hour, namely a speed of 1,852 meters per hour (1,852 m/h), or indeed a speed of 0.5144 meters per second (0.5144 m/s).

Furthermore, a rotorcraft is an aircraft including at least one main rotor that provides at least the lift for the rotorcraft and generally also provides propulsion for it. The main rotor, also known as a "rotary wing", enables the rotorcraft to fly both in cruising flight at high speeds and also at low speeds, or indeed at negative longitudinal speeds, as well as in hovering flight or indeed in lateral (sideward) flight.

Therefore, the airspeed measurement needs differ profoundly between a rotorcraft and a fixed-wing aircraft, since their respective flight envelopes are different. Indeed, a rotorcraft requires airspeed to be known over its entire flight envelope, and in particular for the low forward speeds both along the longitudinal axis and along the lateral axis. In addition, due to the capacity of the rotorcraft in lateral and rearward flight, information on the direction of the airspeed vector, in addition to the amplitude of the airspeed, would be useful.

Moreover, the use of at least one main rotor generates an airflow in the surrounding environment of the rotorcraft, which airflow is substantially vertical at low speeds and can interfere with the measurements taken by a conventional anemometer installation provided with a Pitot tube. Furthermore, when the rotorcraft is close to the ground, e.g. during takeoff or landing, the ground effect on the airflow generated by the main rotor can amplify that disturbance on the airspeed measurements taken by conventional means.

In this context, other methods of measuring airspeed have been developed that procure, in particular, measurements of airspeed defined on at least two axes, e.g. a longitudinal axis and a lateral axis of the aircraft.

For example, an anemometer of the Low-Range Airspeed System (LORAS) type uses a pair of Pitot tubes mounted head-to-tail and moved together in rotation so that, by demodulation of the measurement of differential pressure between the two tubes, two airspeed components are delivered.

In another example, an ultrasonic anemometer, using emission and reception of sound waves of the ultrasound type, makes it possible to deliver a measurement of the airspeed over the entire flight envelope of a rotorcraft.

However, those two techniques remain sensitive to the airflow generated by the main rotor of a rotorcraft and the airspeed delivered lacks accuracy and stability at low airspeeds.

An anemometer of the Light Detection and Ranging (LIDAR or lidar) type makes it possible to measure the airspeed vector, including for low airspeeds, by emission and reception of a light beam of the Light Amplification by Stimulated Emission of Radiation (LASER or laser) type. Such a measurement can be taken several meters away from the rotorcraft at a point of the mass of air that is not disturbed by the airflow generated by the main rotor. However, firstly implementing that technique requires costly and voluminous instruments. Secondly, that technique uses the presence of aerosols and/or of solid microparticles in the air in order to reflect the light beam. Such microparticles are found mainly at moderate heights above the ground and such an anemometer of the lidar type does not operate further away from the ground.

Other types of anemometers have been developed that, unlike the anemometer of the lidar type, do not seek to distance the place where the measurements are taken from the airflow generated by the main rotor, but rather to use that airflow.

In particular, the anemometer of the Low Airspeed Sensing Indication Equipment (LASSIE) type uses a Pitot tube mounted as a wind vane, positioned under the main rotor and that aligns itself along the local airflow, which is a combination of the airflow generated by the main rotor and of the airflow generated by the movement of the rotorcraft. The topology of the induced velocity field of that airflow is a function of the characteristics of the main rotor and is known. Ignoring necking of the stream of air, this airflow is purely vertical for a zero airspeed and tilts as a function of the variations in the airspeed. Therefore, by measuring that tilt or "inclination", it is possible to deduce the longitudinal and lateral components of the airspeed. However, the anemometer of the LASSIE type requires a voluminous installation so that the wind vane is far enough away from the fuselage for the airflow not to be deflected by the fuselage. The external members constituting the apparatus, e.g. the hinge of the wind vane, are also exposed, and therefore vulnerable, even though they are more complex, or indeed more fragile, than a Pitot tube.

An anemometer is also known that is referred to as "VIMI" for "Vitesse indiquée par des Moyens Internes" ("speed indicated by internal means") and that uses measurements of the control of the main rotor and more precisely of the control of the pitch of the blades to determine the longitudinal and lateral components of the airspeed. Such VIMI anemometers are disclosed in Documents FR 2 282 644 and FR 2 565 270 and use firstly two measurements of the position of the cyclic pitch control for cyclically controlling the blades of the main rotor, those measurements corresponding respectively to the longitudinal cyclic pitch and to the lateral cyclic pitch, and secondly measurements of two components of the specific force vector, sometimes improperly called "acceleration", of the rotorcraft on respective ones of the longitudinal and lateral axes.

The two measurements of the positions of the longitudinal and lateral cyclic pitch control deliver an angle of the blades of the main rotor relative to the hub plane (HP), which is perpendicular to the axis of the shaft of the main rotor.

The measurements of the longitudinal and lateral components of the specific force vector of the rotorcraft make it possible to determine the inclination or tilt of the tip-path plane (TPP) relative to a plane of the fuselage that is formed by the longitudinal and lateral axes of the body frame of reference. While they are rotating, the free ends or "tips" of the blades of a rotor of a rotorcraft describe paths that are substantially planar, and substantially identical for all of the blades of the rotor. The plane of said paths is thus referred to as the "tip-path plane" or "TPP" and corresponds to the plane of the rotor disk.

Computation means of that anemometer that are described in Documents FR 2 282 644 and FR 2 565 270 then perform a subtraction between measurements of the longitudinal and lateral cyclic pitches of the blades and measurements of pseudo-attitudes of the rotorcraft so as to determine the longitudinal and lateral components of the airspeed by applying a linear relationship to the result of said subtraction.

However, the locations of the sensors used by such an anemometer, and the simplifying assumptions used—e.g. the direction of the normal to the rotor disk as reflected by the direction of the specific force vector and the coefficient of proportionality between blade pitch and speed that is invariant—limit the field of use of such an anemometer and its accuracy.

The following documents describe an anemometer installation: U.S. Pat. No. 5,063,777, US 2012 089362, US 2016 347467 and XP33277081 "Modeling of a class of UAV helicopters using component buildup method", IEEE, Oct. 29, 2017, pages 6893-6898, DOI: 10.1109/IECON.2017.8217205.

It therefore appears that no known anemometer installation makes it possible to deliver a satisfactory measurement of the airspeed for a rotorcraft over its entire flight envelope simply and inexpensively. And yet it is desirable for information to be available that indicates the amplitude and the direction of the airspeed of a rotorcraft over its entire flight envelope.

BRIEF SUMMARY OF THE INVENTION

An object of the present invention is thus to provide a method of estimating an airspeed of a rotorcraft, and also to provide an anemometer that makes it possible to overcome the above-mentioned limitations. In particular, the present invention makes it possible to estimate one or more components of an airspeed of the rotorcraft that are stable and accurate over the entire flight envelope of the rotorcraft without requiring calibration that is costly in terms of grounding of the rotorcraft and without being subjected to the disturbances of the airflow generated by the rotary wing of said rotorcraft.

To this end, the invention firstly provides a method of estimating an airspeed of a rotorcraft. The rotorcraft includes a fuselage and at least one rotor that rotates about an axis A1 of a mast of the rotor, said at least one rotor being provided with a mast, with a hub, and with a plurality of blades. Each blade has a connected first end and a free second end, each blade being mounted to pivot at least about a flapping axis and about a pitch axis, the free second end of a blade describing a path in the vicinity of a mean plane, said "tip-path plane" TPP, that is common to all of the blades while the blade is rotating. A longitudinal axis X of the tip-path plane TPP extends in a direction going from the tail of the rotorcraft to the nose of the rotorcraft, a lateral axis Y of the tip-path plane TPP extending in a direction going from left to right perpendicularly to the longitudinal axis X.

A frame of reference (X, Y, Z) can thus be defined by the longitudinal axis X, by the lateral axis Y, and by a normal axis Z perpendicular to the tip-path plane TPP. This frame of reference (X, Y, Z) is associated with the tip-path plane TPP but does not rotate relative to the fuselage of the rotorcraft.

The hub is connected to the mast and each blade is connected to the hub via its first end. The axis A1 of the mast of the rotor is generally close to the yaw axis of the rotorcraft, a small angle, typically of 3 degrees or of 4 degrees (3° or 4°) towards the nose of the rotorcraft, separating the axis A1 of the mast of the rotor from the yaw axis.

This method is remarkable in that it includes the following steps:

estimating a pitch angle $\theta_{TPP}$ of at least one blade relative to the tip-path plane TPP;

determining an auxiliary speed of the rotorcraft, the auxiliary speed being equal:
  either to an induced velocity of the air flowing through the rotor;
  or to an axial speed relative to the air at the upstream infinity of the rotorcraft; and determining the airspeed of the rotorcraft in a frame of reference united with the tip-path plane TPP by solving a model of the rotor, the model taking the form of equations putting the pitch angle $\theta_{TPP}$ of at least one blade into relation with the airspeed of the rotorcraft and with the auxiliary speed.

The airspeed of the rotorcraft in a frame of reference united with the tip-path plane TPP may be defined by a vector, by one or more components of the vector that are, for example, defined in the frame of reference (X, Y, Z). The airspeed of the rotorcraft in a frame of reference united with the tip-path plane TPP may alternatively be defined solely by the modulus of said vector.

The method of the invention may be applied to any rotor of the rotorcraft, such as a main rotor providing at least partially the lift or indeed also the propulsion for the rotorcraft, an antitorque tail rotor, or indeed a propulsion propeller of the rotorcraft. Preferably, this method is, however, applied to the main rotor of the rotorcraft.

The model of the rotor reflects the flight mechanics of the rotorcraft, and in particular the behavior of the rotor of the rotorcraft. The model of the rotor puts the pitch angle $\theta_{TPP}$ of at least one blade into relation with the airspeed of the rotorcraft and with the auxiliary speed.

In this way, the method of the invention makes it possible, by solving the model of the rotor, to estimate the airspeed of the rotorcraft, accurately, and advantageously over the entire flight envelope of the rotorcraft, including at low airspeeds.

The pitch angle $\theta_{TPP}$ of a blade about its axis can be broken down into a collective pitch and a cyclic pitch. The collective pitch is equal to a mean value for the pitch over one full turn of the blade, while the cyclic pitch is equal to the half-difference between the maximum value and the minimum value of the angle $\theta_{TPP}$. The cyclic pitch can also be broken down into a longitudinal component and a lateral component, which components are defined by the azimuth angles of the positions of the blade where the angle $\theta_{TPP}$ takes said maximum and minimum values.

The model of the rotor may include a set of analytical equations established by the theory of the flight mechanics of the rotorcraft, defining the pitch angle $\theta_{TPP}$ of at least one blade as a function of the airspeed of the rotorcraft and of the auxiliary speed.

For example, the set of equations includes equations expressing the pitch angle $\theta_{TPP}$ as a function of the airspeed of the rotorcraft and of the auxiliary speed. In particular, the set of equations can put into relation the collective pitch, the longitudinal cyclic pitch, and the lateral cyclic pitch of a blade relative to the tip-path plane TPP as a function of the airspeed of the rotorcraft and of an auxiliary speed.

Therefore, knowledge of the pitch angle $\theta_{TPP}$ of one or more blades and of an auxiliary speed or indeed of the collective, longitudinal cyclic and lateral cyclic pitches of at least one blade relative to the tip-path plane TPP and of an auxiliary speed makes it possible, by solving this model, to determine the airspeed of the rotorcraft, e.g. components of said airspeed in the frame of reference (X, Y, Z) of the tip-path plane TPP or in a body frame of reference united with said fuselage of the rotorcraft.

For example, the set of equations of this model may be solved by the Newton-Raphson method by means of a computer. A computer may, for example, comprise at least one processor and at least one memory, at least one integrated circuit, at least one programmable system, at least one logic circuit, and at least one analog circuit, these examples not limiting the scope given to the expression "computer". The computer may be a computer dedicated to performing this method or indeed a computer of the rotorcraft that has various different functions.

In order to solve this model of the rotor of the rotorcraft, an estimation of the pitch angle $\theta_{TPP}$ of at least one blade relative to the tip-path plane TPP must be known as well as an auxiliary speed of the rotorcraft, it being possible for said auxiliary speed to be the induced velocity of the air flowing through the rotor or else the axial airspeed at the upstream infinity of the rotorcraft.

Regardless of the reference plane, the pitch angle $\theta$ of a blade about its axis may be defined as a function of the azimuth position $\psi$ of said blade and can be broken down into the collective pitch $\theta_0$, the longitudinal cyclic pitch $\theta_C$ about the longitudinal axis of the rotorcraft and the lateral cyclic pitch $\theta_S$ about the lateral axis of the rotorcraft. This angle $\theta$ varies according to a period function of time t, the period of this function being equal to $2\pi/\Omega$, where $\Omega$ is the speed of rotation of the blade as expressed in radians per second. Said angle $\theta$ of a blade may thus be expressed in the form of a Fourier series development as a function of the azimuth position $\psi$ of the blade, such that:

$$\theta = \theta_0 + \theta_S \cdot \sin \psi + \theta_C \cdot \cos \psi + \ldots + \theta_{iS} \cdot \sin 2\psi + \theta_{iC} \cdot \cos 2\psi \ldots, \qquad [\text{Math 1}]$$

where $$\psi = \Omega \cdot t,$$

$\theta_0$: continuous component constituting the collective pitch of the blade;

$\theta_C$ and $\theta_S$: coefficients of the fundamental component, also referred to as the "harmonic component of rank 1" corresponding to the frequency $\Omega/2\pi$; and $\theta_{iC}$ and $\theta_{iS}$: coefficients of the harmonic of rank i, of amplitudes that are usually negligible on a rotor in which the blades are controlled by a swashplate, where i is an integer greater than or equal to 2.

The collective pitch $\theta_0$ is the continuous component of this breakdown into Fourier series, and thus corresponds to a mean value over time for the angle $\theta$. The coefficients of the fundamental component $\theta_C$ and $\theta_S$ constitute estimations respectively of the longitudinal cyclic pitch and of the lateral cyclic pitch. These coefficients of the fundamental component $\theta_C$ and $\theta_S$ are the coefficients of the cosine and sine functions of the harmonic of rank 1 of this breakdown into Fourier series. The Fourier series development of the angle $\theta$ of a blade can be limited to the harmonic of rank 1:

$$\theta = \theta_0 + \theta_S \cdot \sin \psi + \theta_C \cdot \cos \psi. \qquad [\text{Math 2}]$$

The collective pitch $\theta_0$ of a blade is invariant to change of reference plane between the tip-path plane TPP and the hub plane HP. Conversely, the longitudinal cyclic pitch $\theta_C$ and the lateral cyclic pitch $\theta_S$ of the blade depend on the reference plane. The longitudinal cyclic pitch $\theta_C$ and the lateral cyclic pitch $\theta_S$ of the blade are, in particular, different depending on whether they are expressed relative to the tip-path plane TPP or relative to the hub plane HP.

The estimation of the pitch angle $\theta_{TPP}$ of a blade may thus be obtained directly relative to the tip-path plane TPP, e.g. by means of one or more sensors arranged on or in the blade, or else in or in the vicinity of their pitch hinge. In this way, the method of the invention avoids using a measurement aimed at determining the inclination of said tip-path plane TPP relative to the hub plane HP, thereby advantageously removing a source of error constituted firstly by the measurement instrument error and secondly by the neglected terms in the assumptions on which the estimation of the inclination of the tip-path plane TPP relative to the hub plan HP is based. It is recalled that, with an anemometer of the VIMI type, the inclination of the tip-path plane TPP is measured indirectly by means of the specific forces that are being applied to the fuselage of the rotorcraft in a frame of reference associated with the fuselage of the rotorcraft.

The angle $\theta_{TPP}$ of a blade may be expressed in the frame of reference (X, Y, Z) attached to the tip-path plane TPP by the following relationship:

$$\theta_{TPP} = \theta_0 + \theta_{S/TPP} \cdot \sin \psi + \theta\theta_{C/TPP} \cdot \cos \psi, \text{ where } \psi = \Omega \cdot t. \quad [\text{Math 3}]$$

Estimating the pitch angle $\theta_{TPP}$ of a blade may also be obtained by means of one or more sensors positioned in a frame of reference united with the fuselage of the rotorcraft. In which case, estimating the pitch angle $\theta_{TPP}$ may include the following steps:

measuring a specific force that is being applied to the fuselage of the rotorcraft in a frame of reference united with the fuselage of the rotorcraft;

estimating at least one angle of inclination of the tip-path plane TPP relative to the hub plane HP on the basis of a measurement of the specific force that is being applied to the fuselage of the rotorcraft;

measuring a pitch angle $\theta_{HP}$ in a frame of reference united with the fuselage, the pitch angle $\theta_{HP}$ including a collective component and a cyclic component; and estimating the pitch angle $\theta_{TPP}$ of the blade as a function of the pitch angle $\theta_{HP}$ and of said at least one angle of inclination of the tip-path plane TPP.

The specific force being applied to the fuselage of the rotorcraft may, for example, be described by a vector that thus defines the direction and the modulus of said specific force. For example, measuring said specific force on the fuselage of the rotorcraft may be obtained by apparatus of the Attitude and Heading Reference System (AHRS) type or by an inertial navigation unit, or indeed by a triaxial accelerometer.

Said at least one angle of inclination of the tip-path plane TPP relative to the hub plane HP can then be determined on the basis of the direction of said specific force on the fuselage of the rotorcraft, which specific force is substantially normal to the tip-path plane TPP.

The cyclic component can be broken down into a longitudinal cyclic component and a lateral cyclic component. For example, said at least one angle of inclination of the tip-path plane TPP includes a longitudinal cyclic component $\beta_C$ about the longitudinal axis of the rotorcraft and a lateral cyclic component $\beta_S$ of the tip-path plane TPP about the lateral axis of the rotorcraft. For example, the longitudinal cyclic component $\beta_C$ may be estimated by computing a ratio between a longitudinal specific force component on the fuselage of the rotorcraft, i.e. a specific force component parallel to the longitudinal axis of the rotorcraft, and a normal specific force component on the fuselage of the rotorcraft, i.e. a specific force component parallel to the normal axis of the rotorcraft. For example, the lateral cyclic component $\beta_S$ may be estimated by computing a ratio between a lateral specific force component on the fuselage of the rotorcraft, i.e. a specific force component parallel to the lateral axis of the rotorcraft, and a normal specific force component on the fuselage of the rotorcraft, i.e. a specific force component parallel to the normal axis of the rotorcraft.

In this way, it is possible to write the following two equations:

$$\beta_C = \gamma_x / \gamma_z \text{ and} \quad [\text{Math 4}]$$

$$\beta = \gamma_y / \gamma_z' \quad [\text{Math 5}]$$

where $\gamma_x$, $\gamma_y$, and $\gamma_z$ are respectively the longitudinal, lateral, and normal components of the specific force applied to the fuselage of the rotorcraft.

A more accurate estimation of the longitudinal cyclic component $\beta_C$ of the angle of inclination of the tip-path plane TPP may be obtained by also taking into account an estimation of the aerodynamic drag of the fuselage.

A more accurate estimation of the lateral cyclic component $\beta_S$ of the angle of inclination of the tip-path plane TPP may be obtained by also taking into account an estimation of lateral thrust from antitorque apparatus of the rotorcraft.

For example, measuring the pitch angle $\theta_{HP}$ relative to the hub plane HP may be performed by measurement apparatus united with the hub of the rotor of the rotorcraft. The pitch angle $\theta_{HP}$ includes a collective component and a cyclic component. The cyclic component can be broken down into a longitudinal cyclic component and a lateral cyclic component. For example, the collective component and the longitudinal and lateral cyclic components may be measured on a non-rotary portion of a swashplate of the rotor that controls variations in the collective and cyclic pitches of the blades, or indeed on a pitch hinge of the blade. The collective component and the longitudinal and lateral cyclic components may also be measured at apparatus for controlling the pitches of the blades, e.g. a collective pitch control lever and a cyclic pitch control stick.

The change of reference plane from the tip-path plane TPP to the hub plane HP for the longitudinal cyclic pitch $\theta_C$ and for the lateral cyclic pitch $\theta_S$ can be written:

$$\theta_{C/TPP} = \theta_{C/HP} + \beta_S \text{ and} \quad [\text{Math 6}]$$

$$\theta_{S/TPP} = \theta_{S/HP} - \beta_C, \quad [\text{Math 7}]$$

where $\beta_C$ and $\beta_S$: inclination of the tip-path plane TPP relative to the hub plane HP respectively about a longitudinal axis and about a lateral axis of the rotorcraft.

Furthermore, when the auxiliary speed is the axial airspeed at the upstream infinity of the rotorcraft, determining the auxiliary speed may include the following steps:

estimating a barometric altitude of the rotorcraft, e.g. by means of a static pressure sensor; and determining the upstream infinity airspeed $v_a$ that is equal to a time derivative of the barometric altitude of the rotorcraft.

The barometric altitude of the rotorcraft is estimated as a function of the atmospheric pressure external to the rotorcraft, e.g. by means of a barometric altimeter, said atmospheric pressure external to the rotorcraft varying as a function of the altitude of the rotorcraft. The upstream infinity airspeed $v_a$ may then be determined by means of a computer dedicated to performing this method or else by means of a shared computer of the rotorcraft.

A more accurate estimation of the axial airspeed at the upstream infinity may be obtained by also using a measurement of the static temperature of the air in the vicinity of the rotorcraft.

When the auxiliary speed is the induced velocity of the air flowing through the rotor, determining the auxiliary speed may include the following steps:
  estimating the lift of the rotor of the rotorcraft; and
  computing the induced velocity as a function of the lift and of an area swept by the blades of the rotor, and of a forward speed of the rotorcraft.

Estimating the lift of the rotor may be performed in different ways. For example, the lift of the rotor of the rotorcraft mainly opposes the apparent weight of the rotorcraft. Other terms, such as, for example, an estimation of the vertical drag of the fuselage of the rotorcraft may also be taken into account in computing the lift. Estimating the lift of the rotor may then include the following sub-steps:
  estimating the mass of the rotorcraft;
  measuring a normal component of a specific force that is being exerted on the fuselage of the rotorcraft;
  estimating an apparent weight of the rotorcraft as a function of the mass and of the specific force that is being exerted on the fuselage of the rotorcraft; and
  computing the lift as a function of the apparent weight.

The mass of the rotorcraft may be known at the time of takeoff of the rotorcraft, the mass of fuel consumed being subtracted from said mass at takeoff in order to estimate the mass of the rotorcraft at any subsequent time.

The specific force being exerted on the fuselage of the rotorcraft is, as mentioned above, formed, for example, by a vector that thus defines the direction and the modulus of said specific force.

Estimating the apparent weight of the rotorcraft and computing the lift of the rotor are performed by means of a computer.

In another example, the lift of the rotor of the rotorcraft may also be estimated as a function of a conicity of the rotor and of the second moments of area of the blade. While the rotor is rotating, the blades describe a cone consequent upon the movement of the blades about their respective flapping axes. The conicity of the rotor characterizes this cone described by the blades. For example, the conicity of the rotor may be defined by the mean value $\beta_0$ of the angle of flapping of the blades, low conicity representing a rotor that is almost plane.

Estimating the lift of the rotor may then include the following sub-steps:
  estimating a conicity of the rotor;
  estimating the speed of rotation of the rotor; and
  computing the lift as a function of the conicity, of a second moment of area of each blade about its flapping axis, of the number of blades and of the speed of rotation of the rotor.

Estimating the conicity of the rotor may be performed on the basis of an angle sensor integrated in the flapping hinge of a blade.

The speed of rotation of the rotor is a piece of information that is conventionally available in a rotorcraft and that is estimated by dedicated measurement apparatus. The second moments of area of a blade about its flapping axis are constants that are known by construction.

Then, with the lift of the rotor being known, the induced velocity can be computed, by means of a computer, e.g. by using Froude's momentum theory, as a function:
  i) of the lift;
  ii) of an area swept by the blades of the rotor; and
  iii) of the forward speed.

The airspeed of the rotorcraft, as determined according to the invention on the basis of the model of the rotor, is, for example, constituted by a longitudinal projection $v_l$ and by a lateral projection $v_t$ on the tip-path plane TPP, respectively along the longitudinal axis X and along the lateral axis Y of the frame of reference (X, Y, Z) attached to said tip-path plane TPP.

The airspeed of the rotorcraft as determined according to the invention on the basis of the model of the rotor may, alternatively, when the auxiliary speed used in the model of the rotor is the induced velocity, be constituted by a longitudinal projection $v_l$ and by a lateral projection $v_t$ on the tip-path plane TPP, respectively along the longitudinal axis X and along the lateral axis Y of the frame of reference (X, Y, Z), as well as by a normal projection $v_a$ perpendicular to the tip-path plane TPP.

For example, the set of equations of the model of the rotor may be determined by expressing the equilibrium of the tip-path plane TPP of the rotorcraft. For this purpose, it is possible to express the equality of the lift of all of the blades of the rotor as predicted by blade element theory with the lift of the rotor as predicted by Froude's momentum theory. It is possible also to express that the two moment terms, longitudinal and lateral, are zero if the flapping hinges of the blades are slightly off-center.

If the off-centeredness of said hinges is not zero, it is possible to improve the accuracy of the computations by expressing the equality between the two moment terms with the moment terms resulting from the two components of inclination of the rotor disk.

An example of such a theoretical model of the flight mechanics of rotorcraft rotors that makes it possible to determine such a set of equations has been described in detail in a publication entitled "Helicopter Theory" by Wayne Johnson, 1994, in particular on page 193:

$$\theta_{.75} = \frac{\left(1 + \frac{3}{2}\mu^2\right)\left(\frac{6C_T}{\sigma a} + \frac{3}{8}\mu^2\theta_{tw}\right) + \frac{3}{2}\lambda_{TPP}\left(1 - \frac{1}{2}\mu^2\right)}{1 - \mu^2 + \frac{9}{4}\mu^4} \quad [\text{MATH 8}]$$

$$\theta_{1s} = -\beta_{1c} - \frac{\frac{8}{3}\mu\left(\frac{6C_T}{\sigma a} + \frac{3}{8}\mu^2\theta_{tw}\right) + 2\mu\lambda_{TPP}\left(1 - \frac{3}{2}\mu^2\right)}{1 - \mu^2 + \frac{9}{4}\mu^4}$$

$$\beta_0 = \frac{\gamma/8}{1 - \mu^2 + \frac{9}{4}\mu^4}\left[\right.$$

$$\left(1 - \frac{19}{18}\mu^2 + \frac{3}{2}\mu^4\right)\frac{6C_T}{\sigma a} + \left(\frac{1}{20} + \frac{29}{120}\mu^2 - \frac{1}{5}\mu^4 + \frac{3}{8}\mu^6\right)\theta_{tw} +$$

$$\left.\left(\frac{1}{6} - \frac{7}{12}\mu^2 + \frac{1}{4}\mu^4\right)\lambda_{TPP}\right]$$

$$\theta_{1c} = \beta_{1s} + \frac{\frac{4}{3}\mu\beta_0}{1 + \frac{1}{2}\mu^2}$$

It should be noted that all of the possible variations in the formulation of these equations are covered by the present invention. Thus, for example, Wayne Johnson makes the simplifying assumption that the induced velocity is uniformly distributed over the entire area of the rotor disk, the effect of which assumption is that his equations do not reflect the phenomenon known in French as the "bosse de manche latérale" or the "lateral stick hump", i.e. the hump in the plot of the lateral stick displacement required to compensate for the change in induced velocity distribution due to transverse flow effect at low forward speeds. However, that lateral stick hump can be modelled, e.g. by means of a linear longitudinal distribution of the induced velocity, using the "Blake & White" model described in the document "A Survey of Nonuniform Inflow Models for Rotorcraft Flight Dynamics and Control Applications" by Robert T. N. Chen, 1980, NASA Technical Memorandum 102219. The use of either of those formulations, as well as the use of any of their combinations, does not go beyond the ambit of the present invention.

Three velocity terms are involved in these equations, namely: the radial component $v_r$ which is the projection of the airspeed in the tip-path plane TPP; the axial component $v_a$ of the airspeed, which component is a projection of the airspeed on the normal axis Z of the tip-path plane TPP; and the induced velocity $v_i$ of the air flowing through the rotor. However, it should be noted that the three-dimensional nature, characteristic of the airspeed of a rotorcraft, does not appear in them. Only two velocity terms ($v_r$ and $v_a$) are projections of the airspeed of the rotorcraft, given that the induced velocity term $v_i$ is merely a consequence of the loading of the rotor disk and is not a component of the airspeed of the rotorcraft. This is a consequence of the circular symmetry of a rotor. Due to that symmetry, it is possible to conduct an analysis in the plane containing the radial component $v_r$ of the airspeed of the rotorcraft and thus to reduce the complexity of the problem from three dimensions to two dimensions. Once these equations have been established, it is then necessary to relate $v_r$ and $v_a$ to the three components of the 3D speed of the rotorcraft. This is achieved by introducing a sideslip $\beta$ of the rotorcraft, which sideslip is defined as the angle between the axis carrying the radial component $v_r$ and the projection of the longitudinal axis on the tip-path plane TPP, namely the longitudinal axis X of the frame of reference (X, Y, Z) attached to the tip-path plane TPP, and thus makes it possible to position the radial component $v_r$ of the airspeed of the rotorcraft in said frame of reference (X, Y, Z).

Therefore, a longitudinal component $v_l$ and a lateral or transverse component $v_t$ are defined according to respective ones of projections of the radial component $v_r$ on the longitudinal axis X and on the lateral axis Y. This results in the following relationships between firstly ($v_r, \beta$) and secondly ($v_l, v_t$):

$$v_r = \sqrt{v_l^2 + v_t^2} \text{ and} \quad [\text{MATH 9}]$$

[MATH 10]

$$\beta = tan^{-1}\left(\frac{v_t}{v_l}\right).$$

Then, from the preceding relationships [MATH 8], a set of three equations can be deduced that express the longitudinal cyclic pitch $\theta_C$ and the lateral cyclic pitch $\theta_S$ of a blade, as well as the collective pitch $\theta_{0.75}$ of the blade at three-quarters of its span from the axis A1 of the mast of the rotor as a function, in particular, of the three velocity terms $v_r$, $v_a$ and $v_i$.

The method of the invention then makes it possible to solve this set of equations in order to estimate the longitudinal component $v_l$, the lateral component $v_t$ and the axial component $v_a$ of the airspeed of the rotorcraft in the frame of reference (X, Y, Z) united with the tip-path plane TPP.

Since this set of equations does not have any analytical solution, the estimations of the components of the airspeed of the rotorcraft can be performed using known methods, e.g. the Newton-Raphson method.

The method of the invention may also include a step of transferring the components of the airspeed of the rotorcraft from the frame of reference (X, Y, Z) united with the tip-path plane TPP to a frame of reference united with the fuselage of the rotorcraft, e.g. a frame of reference united with the hub plane HP by applying the relationships [MATH 6] and [MATH 7].

The method of the invention advantageously makes it possible to estimate accurate longitudinal, lateral, and, where applicable, axial components of the airspeed of the rotorcraft over the entire flight envelope of the rotorcraft, namely from hovering at zero forward speed to cruising flights at high forward speed.

These longitudinal, lateral, and, where applicable, axial components of the airspeed of the rotorcraft may be expressed in the frame of reference (X, Y, Z) attached to the tip-path plane TPP or else in a body frame of reference of the rotorcraft.

The present invention also provides apparatus for estimating an airspeed of a rotorcraft.

This apparatus is designed for a rotorcraft including, in particular, a fuselage and at least one rotor that rotates about an axis A1 of the mast of the rotor and that is provided with a mast, with a hub, and with a plurality of blades, each blade having a connected first end and a free second end. The hub is united with the mast and each blade is connected to the hub via its first end. In addition, each blade is mounted to pivot about a pitch axis of the blade, the free second end of each blade describing, as it rotates, a substantially plane path, in the vicinity of a mean plane defining the tip-path plane TPP.

The apparatus for estimating an airspeed of a rotorcraft includes at least one computer and a plurality of sensors. The apparatus is configured to implement the above-described method, at least one of said sensors being suitable for measuring a pitch angle of a blade of the rotor of the rotorcraft. This apparatus for estimating an airspeed of a rotorcraft thus constitutes an anemometer based on using the pitches, relative to the tip-path plane TPP, of the blades of the rotor of the rotorcraft, and makes it possible to determine estimations of components of an airspeed of the rotorcraft, e.g. a longitudinal component and a lateral component of said airspeed.

In a first embodiment of this apparatus, at least one of the sensors makes it possible to measure a pitch angle $\theta_{TPP}$ relative to the tip-path plane TPP.

In a second embodiment of this apparatus, at least one of the sensors makes it possible to measure a pitch angle $\theta_{HP}$ relative to a hub plane HP perpendicular to the axis A1 of the mast of the rotor.

BRIEF DESCRIPTION OF THE DRAWINGS

The invention and its advantages appear in greater detail from the following description of examples given by way of illustration with reference to the accompanying figures, in which.

DETAILED DESCRIPTION OF THE INVENTION

Elements present in more than one of the figures are given the same references in each of them.

Figure 1:
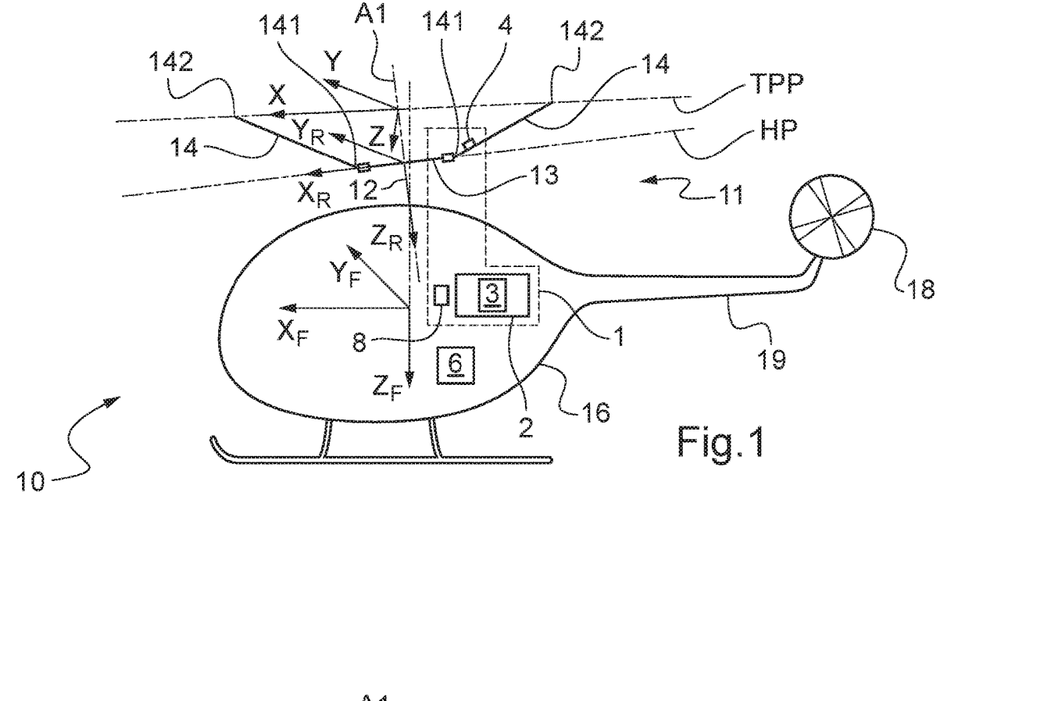
FIGS. 1 and 2 show rotorcraft equipped with apparatus for estimating an airspeed of a rotorcraft.
Figure 2:
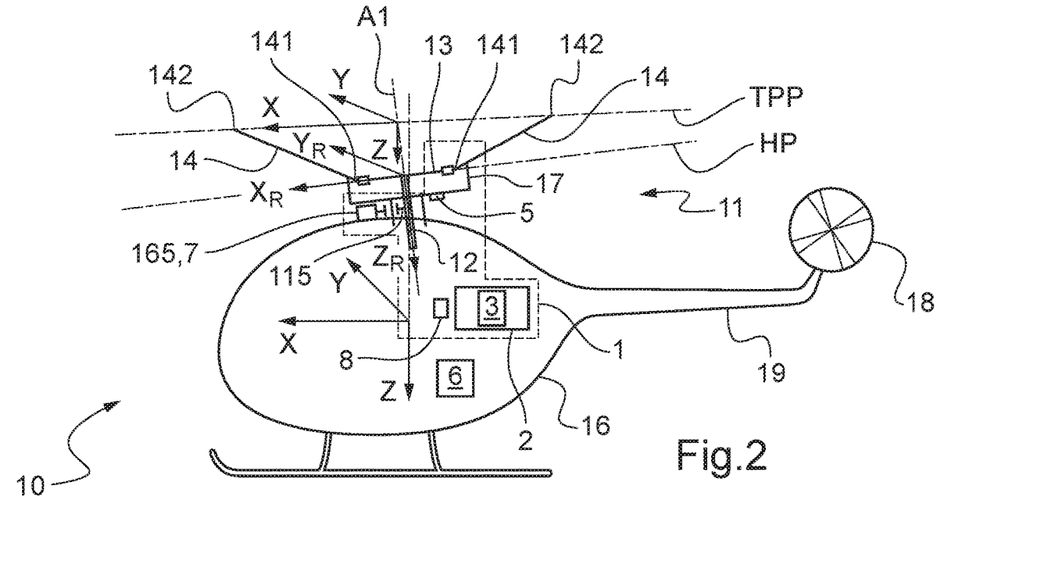

In a manner common to FIGS. 1 and 2, a rotorcraft 10 includes a main rotor 11 positioned above a fuselage 16 of the rotorcraft 10 and an antitorque tail rotor 18 positioned at the rear end of a tail boom 19.

A fuselage frame of reference or "body frame of reference" ($X_F$, $Y_F$, $Z_F$) is attached to this rotorcraft 10, and more particularly to its center of gravity. A longitudinal axis $X_F$ of the rotorcraft 10 extends in a direction going from the tail of the rotorcraft 10 to the nose of the rotorcraft 10. A normal axis $Z_F$ extends in a direction going downwards perpendicularly to the longitudinal axis $X_F$, and a lateral axis $Y_F$ extends in a direction going from left to right perpendicularly to the longitudinal axis $X_F$ and to the normal axis $Z_F$.

The main rotor 11 includes a mast 12, a hub 13, and blades 14. Each blade 14 has a first end 141 that is connected to the hub 13 and a second end or tip 142 that is free. The mast 12 is united with the hub 13, and drives the hub 13 and the blades 14 in rotation about an axis A1 of the mast 12. Each blade 14 is also mounted to pivot about its pitch axis, as well as about its flapping axis and about its drag axis (these axes not being shown).

Therefore, while the main rotor 11 is rotating about the axis A1, the hub 13 moves in a hub plane HP that is perpendicular to an axis A1 of the mast 12 while the free second end 142 of each blade 14 describes a substantially plane path, in the vicinity of a mean plane known as the "tip-path plane" TPP. The path of the free second end 142 of each blade 14 is situated on either side of the tip-path plane TPP and the projection of that path in the tip-path plane TPP is substantially circular.

Another body frame of reference ($X_R$, $Y_R$, $Z_R$) may also be associated with the fuselage 16 of the rotorcraft 10 and more particularly be united with the hub plane HP. This frame of reference ($X_R$, $Y_R$, $Z_R$) does not rotate relative to the fuselage 16, a longitudinal axis $X_R$ being formed by a projection on the hub plane HP of the longitudinal axis $X_F$ of the body frame of reference ($X_F$, $Y_F$, $Z_F$), a lateral axis $Y_R$ being formed by a projection on the hub plane HP of the lateral axis $Y_F$, and a normal axis $Z_R$ extending in a direction going downwards perpendicularly to the hub plane HP.

A frame of reference (X, Y, Z) may also be united with the tip-path plane TPP. This frame of reference (X, Y, Z) does not rotate relative to the fuselage 16 of the rotorcraft 10, a longitudinal axis X being formed by a projection on the tip-path plane TPP of the longitudinal axis $X_F$ of the body frame of reference ($X_F$, $Y_F$, $Z_F$), a lateral axis Y being formed by a projection on the tip-path plane TPP of the lateral axis $Y_F$, and a normal axis Z extending in a direction going downwards perpendicularly to the tip-path plane TPP.

In addition, the rotorcraft 10 may include apparatus of the AHRS type 6 that, in particular, delivers specific forces that are being applied to the fuselage 16 of the rotorcraft 10, e.g. along the axes $X_F$, $Y_F$, $Z_F$ as well as apparatus 1 for estimating an airspeed. The apparatus 1 for estimating an airspeed is based on using the cyclic pitches of the blades 14, relative to the tip-path plane TPP, and makes it possible, in particular to estimate the longitudinal component $v_l$, the lateral component $v_t$ and, where applicable, the axial component $v_a$ of the airspeed of the rotorcraft 10.

The apparatus 1 for estimating an airspeed 1 includes a computer 2 provided with a memory 3 and makes it possible to perform a method of estimating an airspeed of a rotorcraft 10 in order to determine estimations of the components of an airspeed of the rotorcraft 10.

The memory 3 of the computer 2 stores at least one algorithm for performing said method as well as at least one model of the rotor coming from the flight mechanics of the rotorcraft 10, which model defines an equilibrium for the rotor disk and takes the form of equations relating the pitch angle $\theta_{TPP}$ of at least one blade 14 to the airspeed of the rotorcraft 10 and to an auxiliary speed, e.g. the induced velocity of the air flowing through the rotor 11 or else an axial airspeed at the upstream infinity of the rotorcraft 10.

The model of the rotor may include a set of analytical equations of the flight mechanics that, in particular, relate the longitudinal cyclic pitch $\theta_C$ and lateral cyclic pitch $\theta_S$ of the blades 14 to the longitudinal component $v_l$, lateral component $v_t$ and, where applicable, axial component $v_a$ of the airspeed of the rotorcraft 10 and to the auxiliary speed.

The method of estimating an airspeed of a rotorcraft 10 includes firstly a step of estimating a pitch angle $\theta_{TPP}$ of at least one blade 14 relative to the tip-path plane TPP, this step being performed by the apparatus 1 for estimating an airspeed.

In FIG. 1, the apparatus 1 for estimating an airspeed also includes a barometric sensor 8 and a first sensor 4. The first sensor 4 may be arranged on a blade 14 or else in a blade 14, and it measures a first angular parameter that is characteristic of the movement of the blade 14. In this way, the first sensor 4 makes it possible to estimate a pitch angle $\theta_{TPP}$ of the blade 14 relative to the tip-path plane TPP. This pitch angle $\theta_{TPP}$ can be broken down into a collective pitch $\theta_0$, a longitudinal cyclic pitch $\theta_{C/TPP}$ and a lateral cyclic pitch $\theta_{S/TPP}$ of the blade 14.

In FIG. 2, the apparatus 1 for estimating an airspeed includes a computer 2 provided with a memory 3, as well as a barometric sensor 8, a second sensor 5, and a third sensor 7. The second sensor 5 may, for example, be arranged on a non-rotary portion of a swashplate 17 that controls the variations in the pitches of the blades 14 as shown in FIG. 2, or else at control apparatus for controlling the variation in the pitches of the blades 14. The second sensor 5 thus directly or indirectly measures a pitch angle $\theta_{HP}$ relative to the hub plane HP. The pitch angle $\theta_{HP}$ includes a collective component $\theta_0$ and a cyclic component that can be broken down into a longitudinal cyclic component $\theta_{C/HP}$ and a lateral cyclic component $\theta_{S/HP}$.

Figure 3:
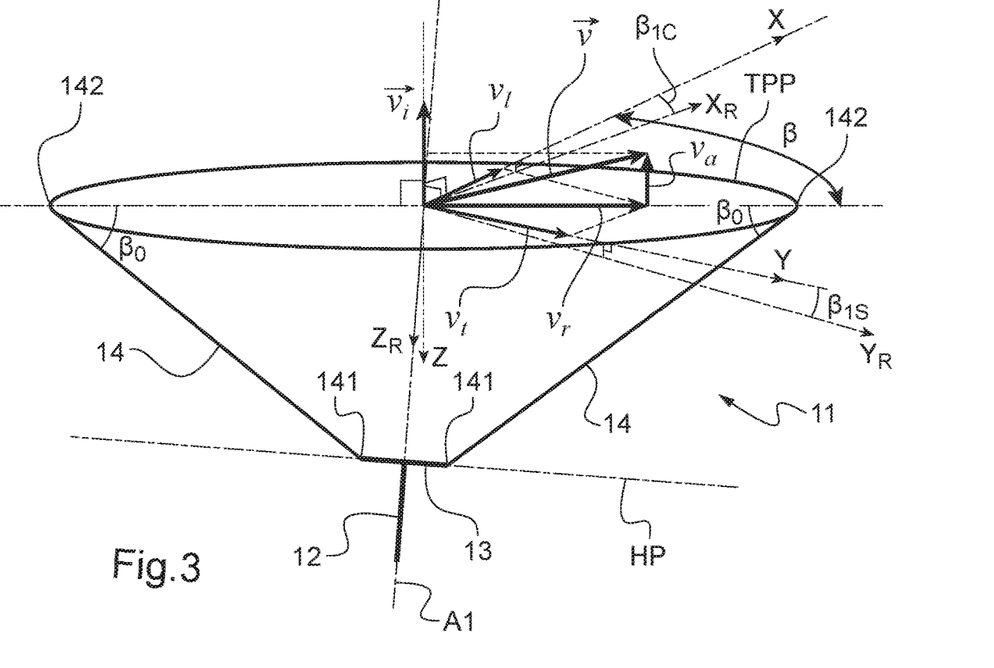
FIG. 3 shows a representation of the rotor disk and of the components of the airspeed.

FIG. 3 diagrammatically shows the rotor 11 as well as the tip-path plane TPP and the hub plane HP. The axis A1 of the mast 12 of the rotor 11 is inclined by a few degrees, typically in the range 3° to 4°, relative to the normal axis $Z_F$. Therefore, the hub plane HP is inclined relative to a horizontal plane formed by the longitudinal axis $X_F$ and by the lateral axis $Y_F$. In addition, during a flight of the rotorcraft 10, the tip-path plane TPP is generally inclined relative to the hub plane HP, except for the particular situation of a flight with zero airspeed, namely a hovering flight in which the rotorcraft 10 is stationary relative to the mass of air.

Since the tip-path plane TPP and the hub plane HP are not generally parallel, the longitudinal cyclic pitch $\theta_C$ and the lateral cyclic pitch $\theta_S$ of each blade 14 of the rotor 11 differ depending on whether they are measured relative to the tip-path plane TPP or relative to the hub plane HP. The relationships for going between these measurements of cyclic pitch can then be written as follows:

$$\theta_{C/TPP} = \theta_{c/HP} + \beta_s \text{ and} \quad [\text{Math 6}]$$

$$\theta_{S/TPP} = \theta_{S/HP} - \beta_c, \quad [\text{Math 7}]$$

where $\beta_c$ and $\beta_s$, are the longitudinal cyclic component and the lateral cyclic component of the angle of inclination of the tip-path plane TPP relative to the hub plane HP respectively about the longitudinal axis $X_F$ and about the lateral axis $Y_F$.

The computer 2 of said apparatus 1 for estimating an airspeed can estimate the pitch angle $\theta_{TPP}$ of the blade 14 as a function of the pitch angle $\theta_{HP}$ and of at least one angle of inclination of the tip-path plane TPP relative to the hub plane HP, said at least one angle of inclination itself being estimated on the basis of a specific force that is being applied to the fuselage 16 of the rotorcraft 10 and that is measured by the apparatus 6 of the AHRS type. Said at least one angle of inclination may include the longitudinal cyclic component $\beta_c$ and the lateral cyclic component $\beta_s$, thereby making it possible to estimate, in particular, a longitudinal cyclic pitch $\theta_{C/TPP}$ and a lateral cyclic pitch $\beta_{S/TPP}$ of the blade 14 relative to the tip-path plane TPP.

Therefore, regardless of its embodiment, the apparatus 1 for estimating an airspeed makes it possible to estimate a pitch angle $\theta_{TPP}$ of the blade 14 relative to the tip-path plane TPP, it being possible for this angle $\theta_{TPP}$ to be broken down into a collective pitch $\theta_0$, a longitudinal cyclic pitch $\theta_{C/TPP}$ and a lateral cyclic pitch $\theta_{S/TPP}$ of the blade 14.

In addition, the third sensor 7 measures instants at which a first mark 115 attached to the rotor 11 goes past a second mark 165 attached to the fuselage 16 and facing said first mark 115 as it goes past. Said third sensor 7 thus makes it possible to determine firstly the azimuth angle $\psi$ of the blade 14 about the axis A1 of the mast 12, as well as the speed of rotation $\Omega$ of the blade 14. For example, the third sensor 7 may be a Hall effect sensor positioned on the fuselage 16 at the second mark 165, a magnet then being positioned at the first mark 115 attached to the rotor 11.

Then, the method of estimating an airspeed of a rotorcraft 10 may include a step of determining an auxiliary speed of said rotorcraft 10, said auxiliary speed being an induced velocity of the air flowing through the rotor 11 or else an axial airspeed at the upstream infinity of the rotorcraft 10.

When the auxiliary speed is the axial airspeed at the upstream infinity of the rotorcraft 10, determining the auxiliary speed may include a step of estimating a barometric altitude of the rotorcraft 10, e.g. by means of the barometric sensor 8, and a step of determining the upstream infinity airspeed $v_a$ equal to a time derivative of the barometric altitude of the rotorcraft 10, this step being performed, for example, by the computer 2.

When the auxiliary speed is the induced velocity of the air flowing through the rotor 11, determining the auxiliary speed may include a step of estimating the lift of the rotor 11 of the rotorcraft 10 and a step of computing the induced velocity as a function of said lift and of an area swept by the blades 14 of the rotor 11.

The step of estimating the lift of the rotor 11 may be performed in different ways. For example, since the lift of the rotor 11 of the rotorcraft 10 mainly opposes the apparent weight of the rotorcraft 10, the step of estimating the lift may include a step of estimating the mass of the rotorcraft 10, a step of measuring a normal component of the specific force that is being applied to the fuselage 16 of the rotorcraft 10, a step of estimating an apparent weight of the rotorcraft 10 as a function of its mass and of said specific force, and a step of computing the lift as a function of said apparent weight.

For example, the specific force that is being applied to the fuselage 16 of the rotorcraft 10 may be formed by a vector thereby defining the direction and the modulus of said specific force in a body frame of reference and may be measured by means of the apparatus 6 of the AHRS type.

Other terms, such as an estimation of the vertical drag of the fuselage 16 of the rotorcraft 10 may also be taken into account in computing the lift.

In another example, the step of estimating the lift may include a step of estimating a conicity of the rotor 11, a step of estimating the speed of rotation of the rotor 11, and a step of computing the lift as a function of the conicity, of a second moment of area of each blade 14 about its flapping axis, of the number of blades, and of the speed of rotation of the rotor 11.

For example, the conicity of the rotor 11 may be estimated on the basis of an angle sensor integrated in the flapping hinge of a blade 14.

The speed of rotation of the rotor 11 may be information delivered by the avionics of the rotorcraft 10 or else be determined by the third sensor 7 as mentioned above.

Then, with the lift of the rotor 11 being known, the induced velocity can be computed, by the computer 2, as a function of the lift of the rotor 11, of an area swept by the blades 14 of the rotor 11, and of the forward speed of the rotorcraft 10, e.g. by using Froude's momentum theory.

Finally, the method of estimating an airspeed of a rotorcraft 10 includes a step of determining said airspeed of the rotorcraft 10 in the frame of reference (X, Y, Z) united with the tip-path plane TPP by solving the model of the rotor 11. For example, the model of the rotor 11 may include the following set of analytical equations [Math 8]:

$$\theta_{75} = \frac{\left(1 + \frac{3}{2}\mu^2\right)\left(\frac{6C_T}{\sigma a} + \frac{3}{8}\mu^2\theta_{tw}\right) + \frac{3}{2}\lambda_{TPP}\left(1 - \frac{1}{2}\mu^2\right)}{1 - \mu^2 + \frac{9}{4}\mu^4}$$

$$\theta_{1s} = -\beta_{1c} - \frac{\frac{8}{3}\mu\left(\frac{6C_T}{\sigma a} + \frac{3}{8}\mu^2\theta_{tw}\right) + 2\mu\lambda_{TPP}\left(1 - \frac{3}{2}\mu^2\right)}{1 - \mu^2 + \frac{9}{4}\mu^4}$$

$$\beta_0 = \frac{\gamma/8}{1 - \mu^2 + \frac{9}{4}\mu^4}\left[\left(1 - \frac{19}{18}\mu^2 + \frac{3}{2}\mu^4\right)\frac{6C_T}{\sigma a} + \right.$$

$$\left.\left(\frac{1}{20} + \frac{29}{120}\mu^2 - \frac{1}{5}\mu^4 + \frac{3}{8}\mu^6\right)\theta_{tw} + \left(\frac{1}{6} - \frac{7}{12}\mu^2 + \frac{1}{4}\mu^4\right)\lambda_{TPP}\right]$$

$$\theta_{1c} = \beta_{1s} + \frac{\frac{4}{3}\mu\beta_0}{1 + \frac{1}{2}\mu^2}$$

The radial component $v_r$ may be defined by a sideslip angle $\beta$ relative to the longitudinal axis $X_F$ of the body frame of reference ($X_F$, $Y_F$, $Z_F$) and relative to the longitudinal axis X of the frame of reference (X, Y, Z) attached to the tip-path plane TPP. This radial component $v_r$ may be broken down into the longitudinal component $v_l$ and the lateral component $v_t$ of the airspeed of the rotorcraft 10 respectively along the longitudinal axis X and along the lateral axis Y of this frame of reference (X, Y, Z) by the following relationships:

$$v_r = \sqrt{v_l^2 + v_t^2} \text{ and} \qquad [\text{Math 9}]$$

[Math 10]

$$\beta = \tan^{-1}\left(\frac{v_t}{v_l}\right).$$

For example, the set of three equations of this model may be solved by the Newton-Raphson model by the computer 2, thereby making it possible to estimate the longitudinal component $v_l$, the lateral component $v_t$ and, where appliable, the axial component $v_a$ of the airspeed of the rotorcraft 10.

Figure 4:
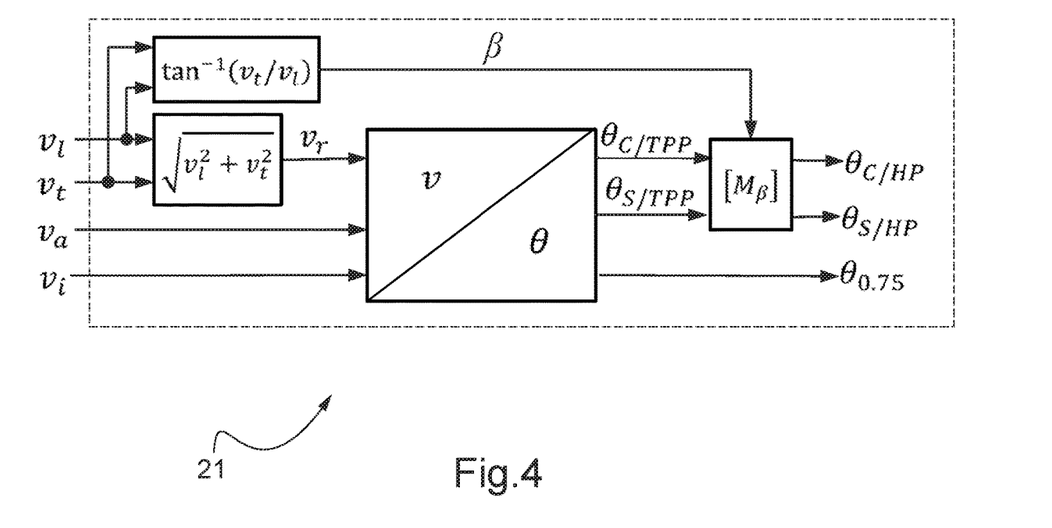
FIG. 4 shows a block diagram relating the components of the airspeed to the pitches of the blades.

The block diagram 21 shown in FIG. 4 shows the links between the components of the airspeed and the pitches of the blades 14 of the rotorcraft 10 by applying this set of equations. The matrix $M_\beta$ is a matrix for transfer between the frame of reference (X, Y, Z) attached to the tip-path plane TPP and the body frame of reference $(X_R, Y_R, Z_R)$ attached to the hub plane HP.

Naturally, the present invention may be subjected to numerous variations as to its implementation. Although several implementations and embodiments are described above, it should readily be understood that it is not conceivable to identify exhaustively all possible implementations and embodiments. It is naturally possible to envisage replacing any of the means described by equivalent means without going beyond the ambit of the present invention.

What is claimed is:

1. A method of estimating an airspeed of a rotorcraft, the rotorcraft including a fuselage and at least one rotor that rotates about an axis of a mast of the rotor, the rotor being provided with the mast, with a hub and with a plurality of blades, each blade having a connected first end connected to the hub and a free second end, each blade being mounted to pivot at least about a flapping axis and about a pitch axis, the free second end of a blade describing a path in the vicinity of a mean tip-path plane while the blade is rotating, a longitudinal axis X of the tip-path plane extending in a direction going from the tail of the rotorcraft to the nose of the rotorcraft, and a lateral axis Y of the tip-path plane extending in a direction going from left to right perpendicularly to the longitudinal axis X, the rotorcraft further including an anemometer installation having a computer and a sensor, the sensor being arranged on a blade of the rotor,
wherein the method comprises the following steps:
measuring, by the sensor arranged on the blade of the rotor, a pitch angle of the blade relative to the tip-path plane;
determining an auxiliary speed of the rotorcraft, the auxiliary speed being equal
to an axial airspeed at the upstream infinity of the rotorcraft;
determining, by the computer, the airspeed of the rotorcraft in a frame of reference united with the tip-path plane by solving a model of the rotor, the model taking the form of equations putting the pitch angle of the blade into relation with the airspeed of the rotorcraft and with the auxiliary speed;
delivering from the anemometer installation an indication of the airspeed of the rotorcraft for a pilot of the rotorcraft; and
wherein the step of determining the auxiliary speed equal to the axial airspeed at the upstream infinity includes the following steps:
estimating a barometric altitude of the rotorcraft; and
determining the axial airspeed at the upstream infinity that is equal to a time derivative of the barometric altitude of the rotorcraft.

2. The method according to claim 1, wherein the pitch angle can be broken down into a collective pitch of the blade as well as into a longitudinal cyclic pitch and lateral cyclic pitch of the blade.

3. The method according to claim 1, wherein the model of the rotor includes an analytical set of equations of the flight mechanics.

4. The method according to claim 3, wherein the set of equations includes equations expressing the pitch angle as a function of the airspeed of the rotorcraft and of the auxiliary speed.

5. The method according to claim 4, wherein the set of equations is solved by the Newton-Raphson method.

6. The method according to claim 1, wherein the airspeed of the rotorcraft can be broken down into a longitudinal projection and into a lateral projection on the tip-path plane.

7. The method according to claim 1, wherein the method includes a step of transferring the airspeed of the rotorcraft from the frame of reference united with the tip-path plane to a frame of reference united with the fuselage of the rotorcraft.

8. The method according to claim 1, further comprising the following steps:
measuring a specific force that is being applied to the fuselage of the rotorcraft in a frame of reference united with the fuselage of the rotorcraft;
estimating at least one angle of inclination of the tip-path plane relative to the frame of reference united with the fuselage on the basis of the specific force that is being applied to the fuselage of the rotorcraft;
measuring, by a second sensor, a pitch angle of the blade in the frame of reference united with the fuselage, the pitch angle in the frame of reference united with the fuselage including a collective component and a cyclic component; and
estimating the pitch angle of the blade relative to the tip-top plane as a function of the pitch angle of the blade in the frame of reference united with the fuselage and of the angle(s) of inclination of the tip-path plane.

9. The method according to claim 8, wherein a longitudinal cyclic component of the angle of inclination of the tip-path plane is also estimated on the basis of an estimation of the aerodynamic drag of the fuselage.

10. The method according to claim 8, wherein a lateral cyclic component of the angle of inclination of the tip-path plane is estimated on the basis of the specific force that is being applied to the fuselage of the rotorcraft and of an estimation of lateral thrust from antitorque apparatus of the rotorcraft.

11. An apparatus for estimating an airspeed of a rotorcraft, the rotorcraft including a fuselage and a rotor that rotates about an axis of a mast of the rotor, the rotor being provided with the mast, a hub, and a plurality of blades, each blade having a connected first end connected to the hub and a free second end, each blade being mounted to pivot at least about a flapping axis and about a pitch axis, the free second end of a blade describing a path in the vicinity of a mean tip-path plane while the blade is rotating, a longitudinal axis X of the tip-path plane extending in a direction going from the tail of the rotorcraft to the nose of the rotorcraft, and a lateral axis Y of the tip-path plane extending in a direction going from left to right perpendicularly to the longitudinal axis X, the apparatus comprising:
an anemometer installation on-board the rotorcraft, the anemometer installation including at least one computer and a plurality of sensors suitable for measuring a pitch angle of a blade of the rotor;

wherein a first one of the sensors is arranged on the blade to measure the pitch angle of the blade relative to the tip-top plane;

wherein a second one of the sensors is arranged on a swashplate of the blade to measure the pitch angle of the blade relative to a hub-plane perpendicular to the axis of the mast of the rotor;

the computer being operable to estimate the pitch angle of the blade relative to the tip-top plane based in part on the pitch angle of the blade relative to the hub-plane;

the computer being further operable to determine the airspeed of the rotorcraft in a frame of reference united with the tip-path plane by solving a model of the rotor, the model taking the form of equations putting either the measured or estimated pitch angle of the blade relative to the tip-top plane into relation with the airspeed of the rotorcraft and with an auxiliary speed of the rotorcraft; and the anemometer installation being operable to deliver an indication of the airspeed of the rotorcraft for a pilot of the rotorcraft.

12. A rotorcraft comprising:

a fuselage and a rotor that rotates about an axis of a mast of the rotor, the rotor being provided with the mast, a hub, and a plurality of blades, each blade having a connected first end connected to the hub and a free second end, each blade being mounted to pivot at least about a flapping axis and about a pitch axis, the free second end of a blade describing a path in the vicinity of a mean tip-path plane while the blade is rotating, a longitudinal axis X of the tip-path plane extending in a direction going from the tail of the rotorcraft to the nose of the rotorcraft, and a lateral axis Y of the tip-path plane extending in a direction going from left to right perpendicularly to the longitudinal axis X;

an anemometer installation including a computer and a plurality of sensors suitable for measuring a pitch angle of a blade of the rotor;

wherein a first one of the sensors is arranged on the blade to measure the pitch angle of the blade relative to the tip-top plane;

a second one of the sensors is arranged on a swashplate of the blade to measure the pitch angle of the blade relative to a hub-plane perpendicular to the axis of the mast of the rotor;

the computer is operable to estimate the pitch angle of the blade relative to the tip-top plane based in part on the pitch angle of the blade relative to the hub-plane;

the computer is further operable to determine the airspeed of the rotorcraft in a frame of reference united with the tip-path plane by solving a model of the rotor, the model taking the form of equations putting either the measured or estimated pitch angle of the blade relative to the tip-top plane into relation with the airspeed of the rotorcraft and with an auxiliary speed of the rotorcraft; and the anemometer installation is operable to deliver an indication of the airspeed of the rotorcraft for a pilot of the rotorcraft.

* * * * *